(12) United States Patent
Adams

(10) Patent No.: US 9,834,283 B2
(45) Date of Patent: Dec. 5, 2017

(54) MOORING SYSTEM AND MOORING BUOY

(71) Applicant: JKP Marine Pty Ltd, Mount Claremont (AU)

(72) Inventor: Robert William Adams, Mount Claremont (AU)

(73) Assignee: JKP MARINE PTY LTD, Westrern Australia (AU)

( * ) Notice: Subject to any disclaimer, the term of this patent is extended or adjusted under 35 U.S.C. 154(b) by 0 days.

(21) Appl. No.: 15/325,573

(22) PCT Filed: Jul. 30, 2015

(86) PCT No.: PCT/AU2015/000447
§ 371 (c)(1),
(2) Date: Jan. 11, 2017

(87) PCT Pub. No.: WO2016/015089
PCT Pub. Date: Feb. 4, 2016

(65) Prior Publication Data
US 2017/0158289 A1    Jun. 8, 2017

(30) Foreign Application Priority Data

Jul. 31, 2014   (AU) ................................ 2014902953

(51) Int. Cl.
*B63B 22/02* (2006.01)
*H04B 1/38* (2015.01)
(Continued)

(52) U.S. Cl.
CPC .............. *B63B 22/02* (2013.01); *G07B 15/00* (2013.01); *G07B 15/063* (2013.01); *G08G 3/00* (2013.01);
(Continued)

(58) Field of Classification Search
CPC ......... B63B 22/00; B63B 22/02; B63B 22/16; B63B 22/163; B63B 22/166; B63B 22/18;
(Continued)

(56) References Cited

U.S. PATENT DOCUMENTS 4,529,388 A * 7/1985 Jones ...................... B63B 22/02
114/230.11
4,763,126 A   8/1988 Jawetz
(Continued)

FOREIGN PATENT DOCUMENTS

| JP | 2011-116150 A | 6/2011 |
|---|---|---|
| WO | WO 2004/032064 A1 | 4/2004 |
| WO | WO 2011/096901 A1 | 8/2011 |

OTHER PUBLICATIONS

International Search Report prepared by the Australian Patent Office dated Sep. 29, 2015, for International Application No. PCT/AU2015/000447.
(Continued)

*Primary Examiner* — Ajay Vasudeva
(74) *Attorney, Agent, or Firm* — Lewis Brisbois Bisgaard & Smith LLP

(57) ABSTRACT

A mooring buoy comprising a buoyant body, an attachment point for attaching the buoy to a marine vessel, a controller, an RF communication device for receiving a vessel ID identifying the marine vessel and a movement sensor, wherein the controller is arranged to determine when the marine vessel is moored to the mooring buoy based on the received vessel ID and the movement sensor.

18 Claims, 15 Drawing Sheets

(51) Int. Cl.
*H01Q 1/34* (2006.01)
*G07B 15/00* (2011.01)
*G08G 3/00* (2006.01)
*G07B 15/06* (2011.01)
*H04B 1/3822* (2015.01)

(52) U.S. Cl.
CPC ............. *H01Q 1/34* (2013.01); *H04B 1/3822* (2013.01); *B63B 2201/20* (2013.01); *B63B 2203/00* (2013.01)

(58) Field of Classification Search
CPC ............ B63B 2203/00; B63B 2201/20; H04B 1/3822; H01Q 1/34; G07B 15/00; G07B 15/02; G07B 15/063; G08G 3/00
See application file for complete search history.

(56) References Cited

U.S. PATENT DOCUMENTS

| | | | |
|---|---|---|---|
| 2004/0056779 A1 | 3/2004 | Rast | |
| 2009/0228349 A1 | 9/2009 | Dyhrberg et al. | |
| 2011/0304480 A1* | 12/2011 | Doria | B63B 22/02 340/984 |
| 2012/0063262 A1 | 3/2012 | Imran | |
| 2014/0142845 A1* | 5/2014 | Fueller | G08G 3/00 701/461 |
| 2016/0267435 A1* | 9/2016 | Eid | G06Q 10/109 |

OTHER PUBLICATIONS

Written Opinion prepared by the Australian Patent Office dated Sep. 29, 2015, for International Application No. PCT/AU2015/000447.

International Preliminary Report on Patentability (Chapter II) prepared by the Australian Patent Office on May 27, 2016, for International Application No. PCT/AU2015/000447.

* cited by examiner

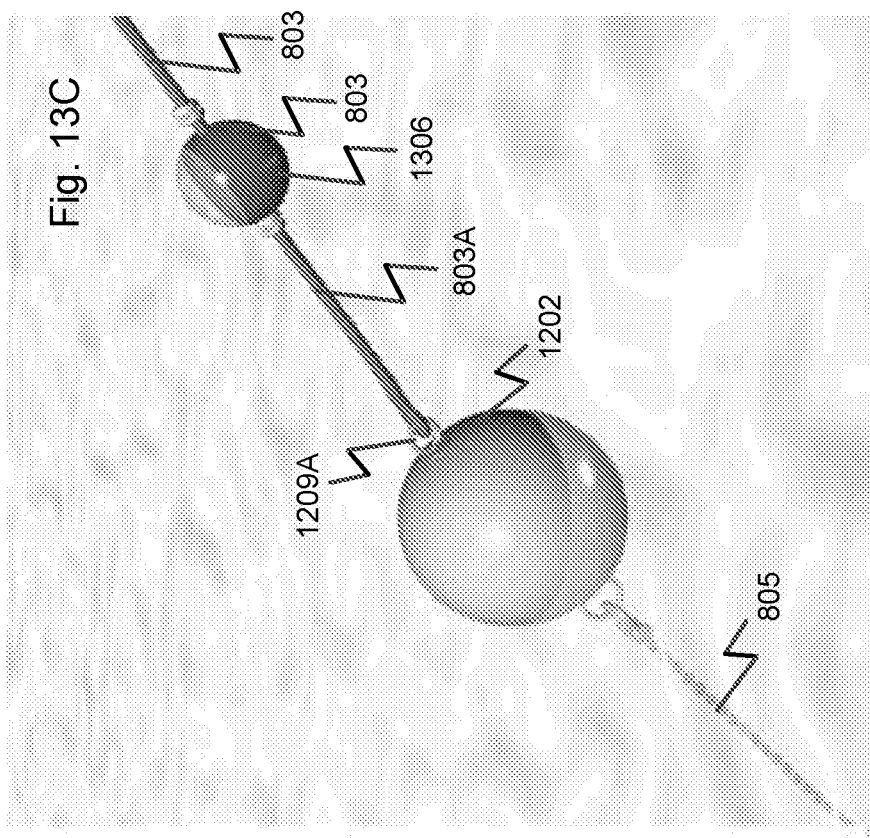
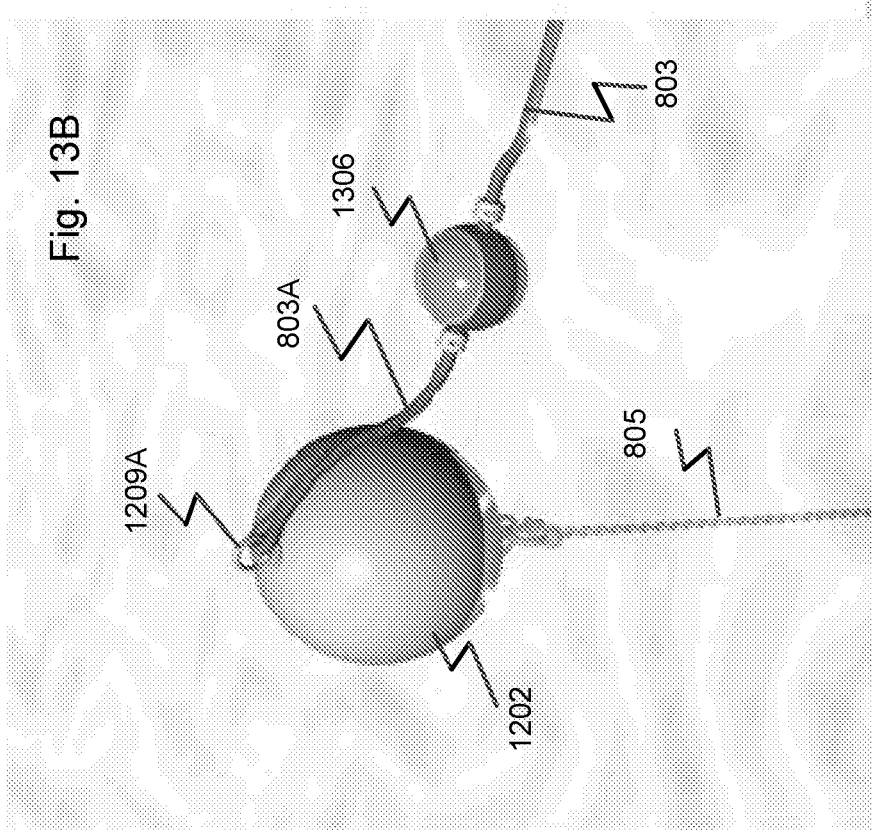

MOORING SYSTEM AND MOORING BUOY

CROSS REFERENCE TO RELATED APPLICATIONS

This application is a national stage application under 35 U.S.C. 371 and claims the benefit of PCT Application No. PCT/AU2015/000447 having an international filing date of 30 Jul. 2015, which designated the United States, which PCT application claimed the benefit of Australian Patent Application No. 2014902953 filed 31 Jul. 2014, the disclosure of each of which are incorporated herein by reference.

TECHNICAL FIELD

The present invention relates generally to a mooring system and a mooring buoy.

BACKGROUND

In marinas and the like, boat owners (or owners of other marine vessels) are required to lease or rent berths or spaces for mooring their boat. This can result in owners paying for a marina space for a period of time when they might not be using the space. Further, the lease of that space means that the space cannot be used by other marina users even though the space may be available.

Upon leasing or renting a space in a marina, it may also become problematic for the marina owner to be able to police the area to ensure the correct boats are moored in the correct areas. For example, visual identification of each boat at the designated area may be required, which can be problematic.

Boat owners who have not previously used a particular marina may find it problematic in locating specific mooring areas allocated to that boat.

Boat owners may not have confidence that the mooring/berth they have booked will be available when they arrive. That is, they may have to search for another mooring/berth due to another vessel being in their pre-organised position. Such a search may increase safety concerns as this is generally when crews are tired and weather conditions generally deteriorate towards the end of the day.

SUMMARY

It is an object of the present invention to substantially overcome, or at least ameliorate, one or more disadvantages of existing arrangements.

Disclosed are arrangements which seek to address the above problems by providing an intelligent mooring system.

According to a first aspect of the present disclosure, there is provided a mooring buoy comprising a buoyant body, an attachment point for attaching the buoy to a marine vessel, a controller, an RF communication device for receiving a vessel ID identifying the marine vessel and a movement sensor, wherein the controller is arranged to determine when the marine vessel is moored to the mooring buoy based on the received vessel ID and the movement sensor.

According to a second aspect of the present disclosure, there is provided a mooring system comprising at least one mooring buoy as described above, a vessel RF communication device located on a marine vessel, and a booking system, wherein the booking system is arranged to receive booking data comprising at least a vessel ID associated with the marine vessel, wherein the vessel RF communication device is arranged to transmit the vessel ID to the RF communication device of the mooring buoy, wherein the RF communication device of the mooring buoy is arranged to receive the vessel ID upon the movement sensor detecting a mooring position, wherein the mooring buoy is further arranged to communicate with the booking system over a communication network to obtain at least one booking vessel ID from the booking system, wherein the controller in the buoy is further arranged to determine whether the obtained booking vessel ID is associated with the at least one mooring buoy based on the received vessel ID.

The mooring buoy may have a visual and/or audible indicator, whereupon a negative determination that the obtained booking vessel ID is associated with the at least one mooring buoy based on the received vessel ID, the visual and/or audible indicator is arranged to emit a visual and/or audible signal. The at least one mooring buoy may have a unique ID that is transmitted to the booking system on a periodic basis to obtain the at least one booked vessel ID from the booking system.

Other aspects of the invention are also disclosed.

BRIEF DESCRIPTION OF THE DRAWINGS

At least one embodiment of the present invention will now be described with reference to the drawings, in which:

FIGS. 13A to 13C show a mooring system according to yet another alternative embodiment of the present disclosure.

DETAILED DESCRIPTION INCLUDING BEST MODE

It will be understood that various elements and or functions as described in respect of one or more examples and/or embodiments may also be used in other examples and/or embodiments.

Figure 1A:
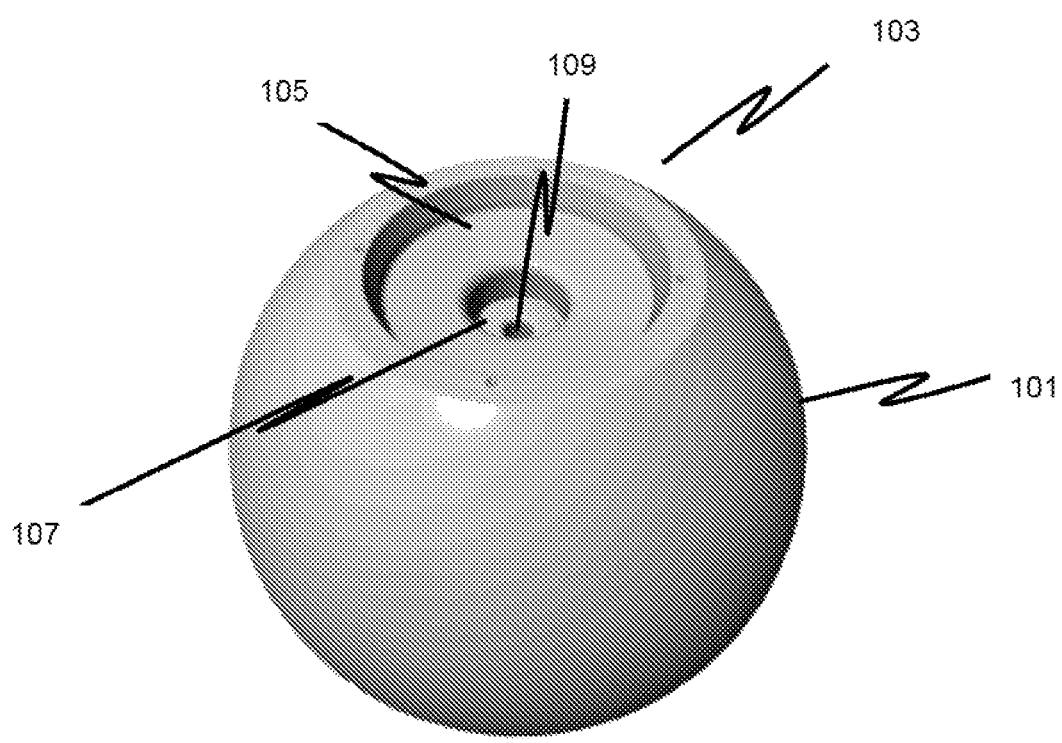
FIGS. 1A and 1B show an upper perspective and lower perspective view of a mooring buoy body according to the present disclosure.

FIG. 1A shows an upper perspective view of a buoy body 101 forming part of a mooring buoy. The buoy body is buoyant and may be moulded from any plastic material that is suitable for use in sea water. For example, the buoy may be moulded from a polycarbonate material.

The buoy body 101 is generally spherical in shape with an upper portion 103 having a first circular recess 105 for receiving an electronics housing assembly, as described in detail below. A smaller second circular recess 107 is formed in a central area of the first circular recess 105 for receiving an upper disc portion of a bar assembly (see FIG. 2). An aperture 109 for receiving the bar portion of the bar assembly is formed at the center of the second circular recess 107 and passes through the body of the buoy.

Figure 1B:
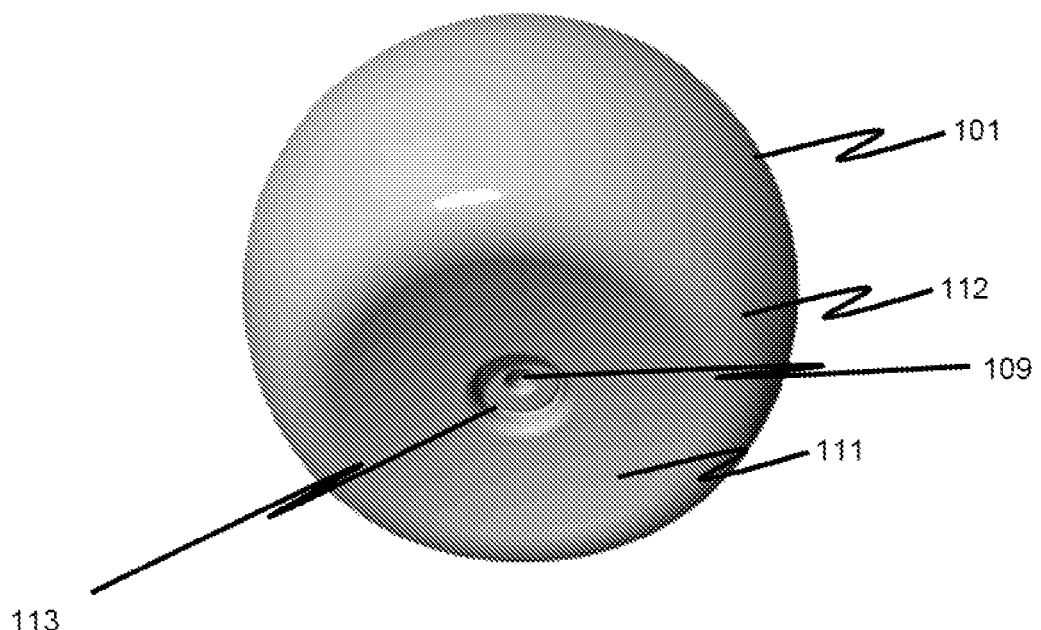

FIG. 1B shows a lower perspective view of the mooring buoy body 101. A concave indentation 111 is formed on the lower portion 112 of the body. The concave indentation has a diameter that is approximately 60-70% of the diameter of the buoy body. This concave indentation opposes the first and second circular recesses located on the upper portion of the body. In the center of the concave indentation 111 is a third circular recess 113 that opposes the second circular recess 107. The aperture 109 extends through the body to the centre of the third circular recess 113.

Figure 2:
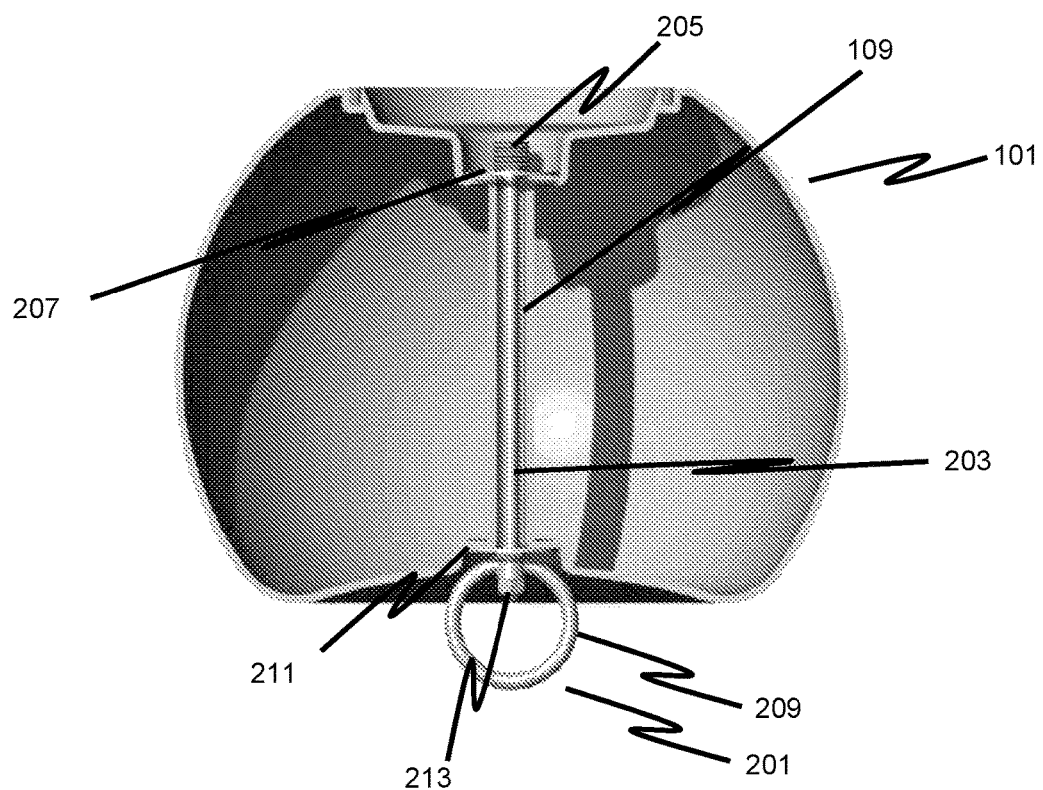
FIG. 2 shows a cross sectional view of a mooring buoy body according to the present disclosure.

FIG. 2 shows a cross sectional view of the buoy body 101 with a bar assembly 201 passing through the aperture 109.

The bar assembly 201 has a longitudinal bar portion 203 with a screw thread 205 formed at a first distal end. A first disc washer 207 is formed, welded or attached to the first distal end of the bar 203 between the screw thread and the bar 203. The first disc washer 207 is fitted over the screw thread 205 and sits within the second circular recess 107.

At a second distal end of the bar assembly 021 is located an attachment point 209 in the form of a tie ring. The tie ring is formed, welded or attached to the second distal end of the bar 203. In between the tie ring 209 and the bar 203, a second disc washer 211 is formed, welded or attached to the bar assembly. A nut 213 is attached to the second distal end of the bar assembly to keep the attachment point 209 in position.

As will be explained in more detail below, the attachment point is used to attach the buoy to a marine vessel. For example, a mooring line may be attached between the attachment point and the marine vessel. It will be understood that other mechanisms could be used to attach the marine vessel to the attachment point of the buoy. Further, the attachment point is also used for attaching a weighted chain to keep the buoy upright.

Therefore, the mooring buoy has a buoyant body with an upper body portion and lower body portion, wherein the lower portion is arranged to be at least partially submerged when in an idle position and the attachment point is used to attach the lower body portion to a marine vessel, such as a boat or yacht for example.

Figure 3A:
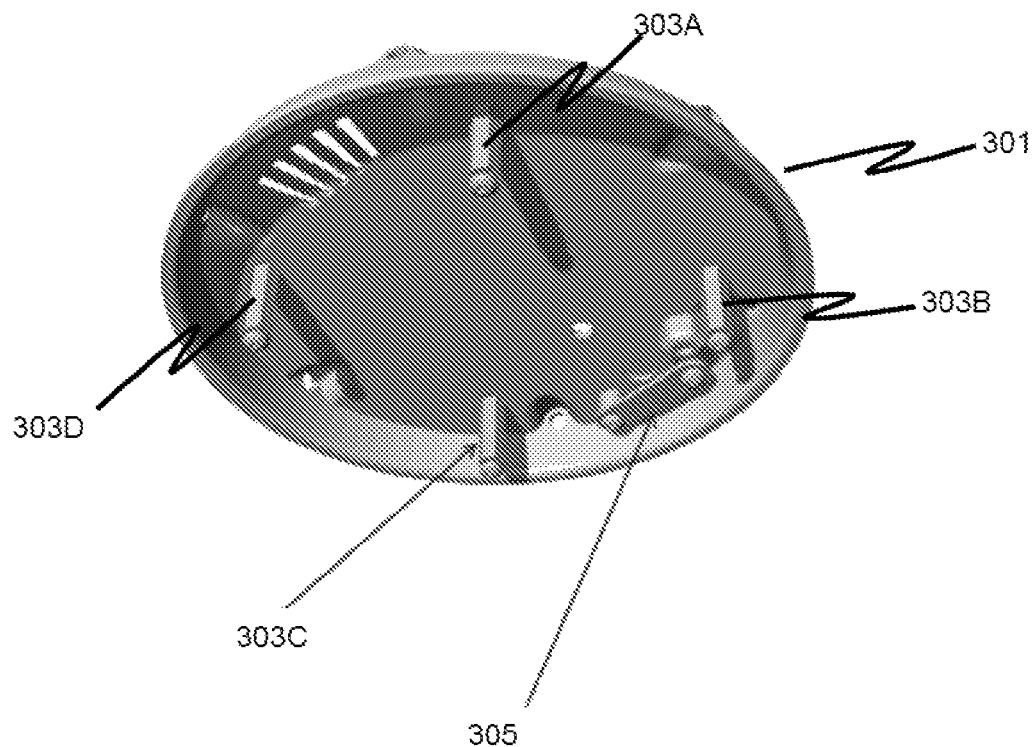
FIGS. 3A and 3B show an electronics housing for use with a mooring buoy according to the present disclosure.

FIG. 3A shows a lower view of a circular curved plastic upper portion 301 of an electronics housing for use with the mooring buoy described above. The upper portion has four vertical standoffs 303A-D and screws. The standoffs extend perpendicularly from the upper portion 301. The standoffs and screws are used to secure a printed circuit board to the housing, as described below. A retainer bracket 305 is used to retain a GPS antenna.

Figure 3B:
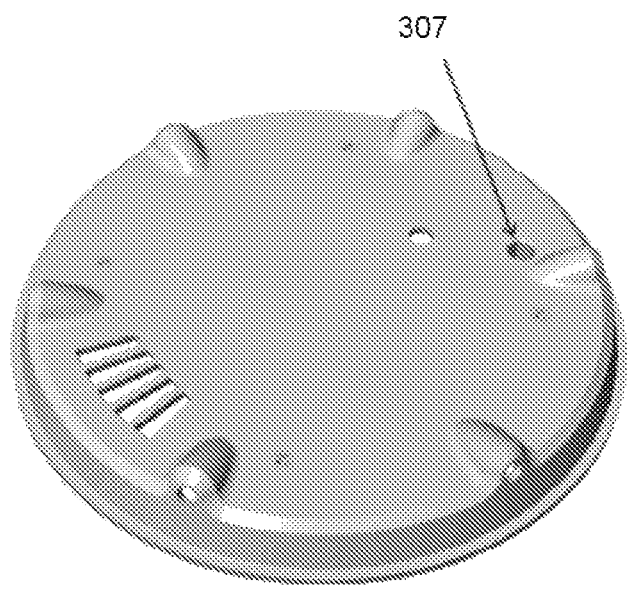

FIG. 3B shows an upper view of the upper portion 301 of the electronics housing. A cellular antenna retainer socket 307 is formed through the upper portion.

Figure 4A:
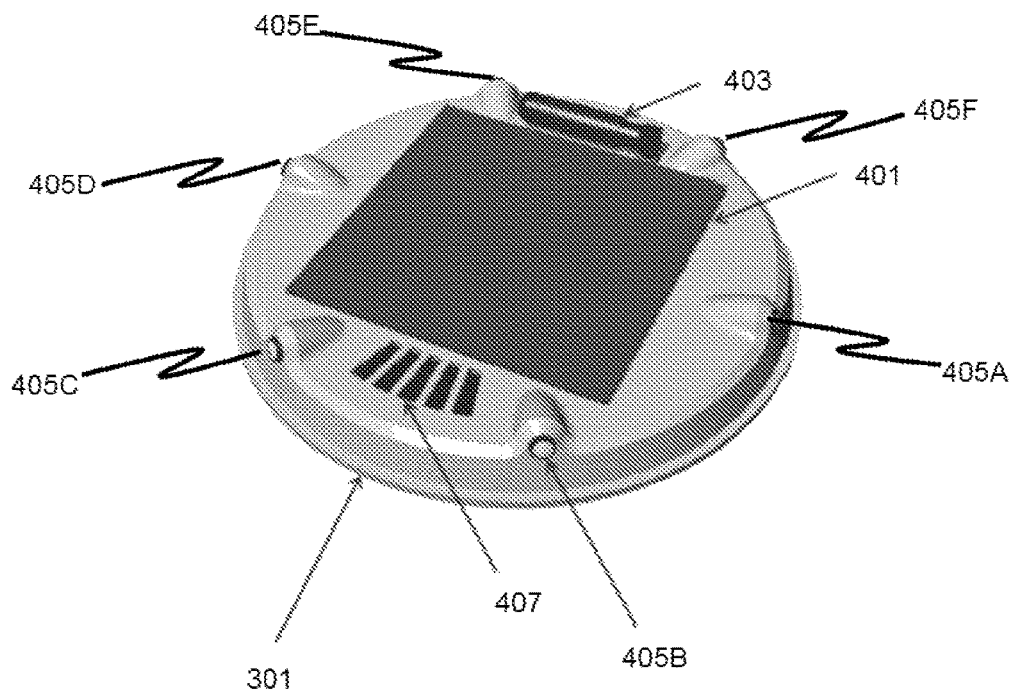
FIGS. 4A and 4B show an upper view and a lower view of the electronics on an electronics housing according to the present disclosure.

FIG. 4A shows an upper view of the electronics when fitted to the upper portion of the electronics housing. A solar cell 401 is fitted to the housing to provide power to the electronic devices and sensors in the housing via a battery.

Within the housing is fitted an RF communication device in the form of an RF antenna. The RF antenna is suitable for transmitting and receiving RF signals within a local area. The RF antenna may be a low power antenna so as not to drain excessive battery power. The RF antenna may be a class 1 Bluetooth device.

Optionally a cellular antenna 403 may be fitted to the antenna retainer socket 307. It will be understood that the cellular antenna may be any suitable cellular communication antenna, such as a 3G or 4G antenna to enable communication to a cellular network. Further, it will be understood that the mooring buoy may have a satellite antenna arranged to communicate with an external booking system over a satellite network. Indeed, it will be understood that any other suitable communication network may be used for communicating between the communication antenna and the external booking system.

Six visual indicators in the form of LEDs 405A-F are fitted into six apertures located around the periphery of the housing.

A sound vent 407 is formed through the housing to allow the sound to emanate from an audible indicator, such as a siren.

Figure 4B:
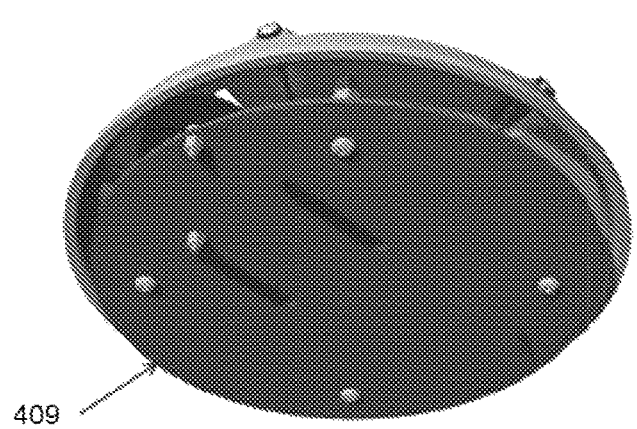

FIG. 4B shows a lower view of the electronics fitted to the upper portion of the electronics housing. In particular, a printed circuit board (PCB) 409 is attached to the standoffs. The PCB includes a controller with memory, a movement sensor (such as an accelerometer for example) arranged to detect the orientation of the mooring buoy, an audible device as well as other circuitry for sending signals to and receiving signals from the RF antenna. The PCB obtains power from the solar cell and an internal battery that is charged from the solar cell.

Optionally, the PCB may also include a GPS device arranged to detect the position of the mooring buoy. The controller may be arranged to control the operation of the GPS device.

The controller is arranged to control communications to and from the RF communication device, the audible device, the visual indicators and the solar device. For example, the controller may be a microprocessor that operates via algorithms executed using a software program. Operation of these various elements may be dependent upon signals received from other RF communication devices, such as an RF communication device located on the marine vessel and an RF communication device in a mooring buoy booking control system, for example.

Alternatively, operation of these various elements may be dependent upon signals received from a booking system in communication via the cellular antenna. That is, the controller may also be arranged to control communications to and from the cellular antenna in order to access data in the booking system database and receive control signals from the booking system.

Figure 5A:
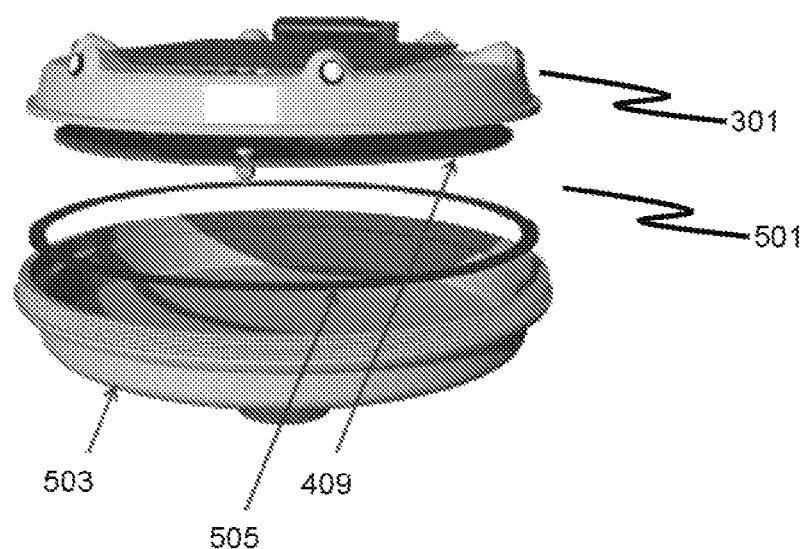
FIGS. 5A and 5B show the assembly of an electronics housing assembly according to the present disclosure.

FIG. 5A shows a first view of an electronics housing 501 including the upper portion 301, a base moulding 503 and a water proof seal 505, such as a foam tape spacer gasket, that protects the electronics. The upper portion 301 fits inside the circumference of the base moulding 503. This enables the upper portion and base moulding to be fitted together with the water proof seal 505 located in between.

Figure 5B:
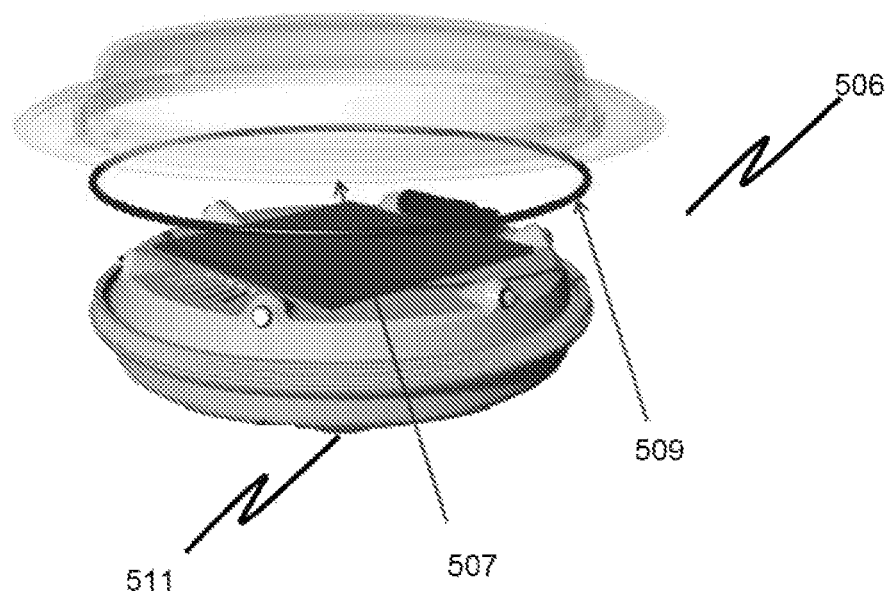

FIG. 5B shows a view of an electronics housing assembly 506 with the upper portion and base moulding attached together. A clear plastic cover 507 is placed over the top of the electronic housing 501 with a further water proof seal 509, such as an O-ring, positioned to seal the cellular antenna (if used) and the solar cell from the water. The plastic cover 507 has a screw thread formed on an inside edge of its outer circumference that corresponds with a screw thread located on the outside edge of the outer circumference of the base moulding 503. This enables the plastic cover 507 to be screwed onto the base moulding 503 over the top of the electronic housing 501 to form a seal using the further water proof seal 509.

Figure 6:
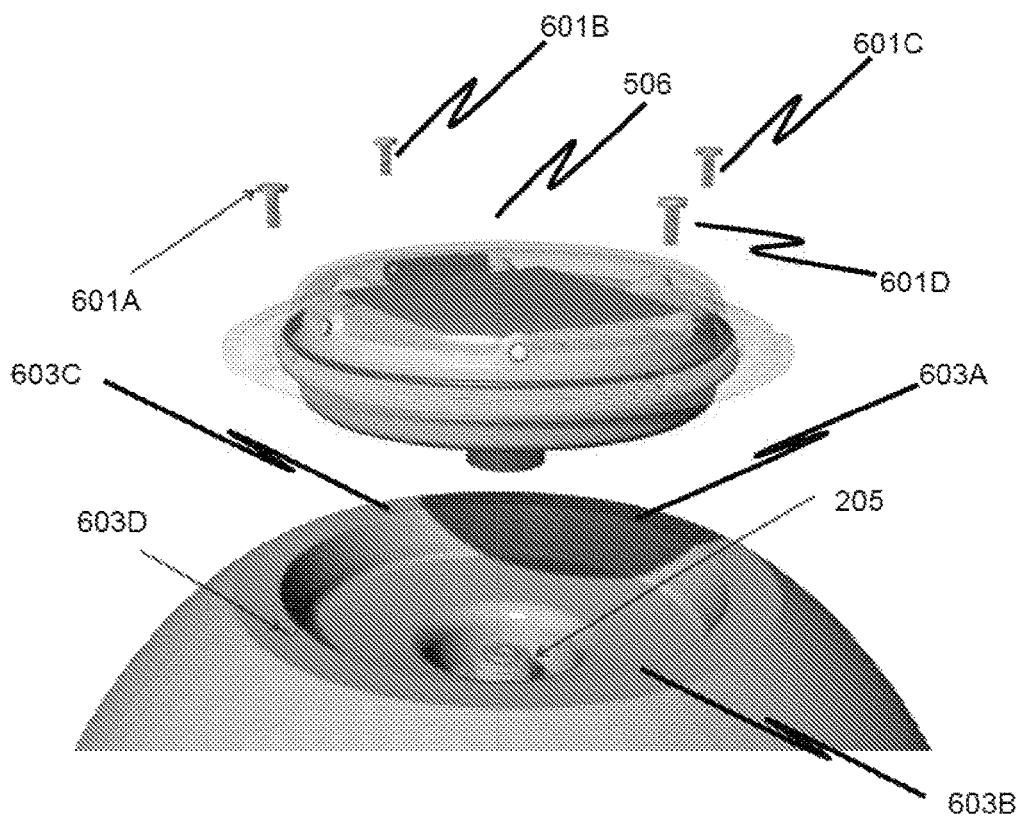
FIG. 6 shows the assembly of an electronic housing assembly and mooring buoy according to the present disclosure.

Extending from a bottom central portion of the base moulding is a screw thread moulding 511 that corresponds with the screw thread 205 of the bar assembly 201. This enables the electronics housing assembly 506 to be attached to the upper portion of the buoy body and fit into the first circular recess 105 as shown in FIG. 6.

Custom locking screws 601A-D are provided to screw the electronic housing into place securely via the screw recesses 603A-D on the buoy body.

Therefore, the mooring buoy has a buoyant body, an attachment point for attaching the mooring buoy to a marine vessel, a controller, a RF communication device and a movement sensor.

As will be explained in more detail below, the RF communication device is arranged to receive a vessel ID from the marine vessel, where the vessel ID identifies the marine vessel. For example, the RF communication device is arranged to receive the vessel ID associated with the marine vessel from a vessel RF communication device located on the marine vessel.

Further, as will be explained in more detail below, the controller may be arranged to determine when the marine vessel is moored to the mooring buoy based on the received vessel ID and optionally the movement sensor. That is, the controller can make a determination as to whether a specific marine vessel with a unique vessel ID is moored to the mooring buoy. This determination may be made after or before the movement sensor detects that the buoy has moved to a mooring position.

The herein described buoy includes a single, robust and reliably sealed self-contained electronics module. The electronics module can be quickly and easily exchanged with a replacement module if required. The secure and robust attachment of the electronic module to the buoy requires a non-standard tool to remove the module. There are no moving parts on the buoy that can be choked up by marine growth.

Figure 7A:
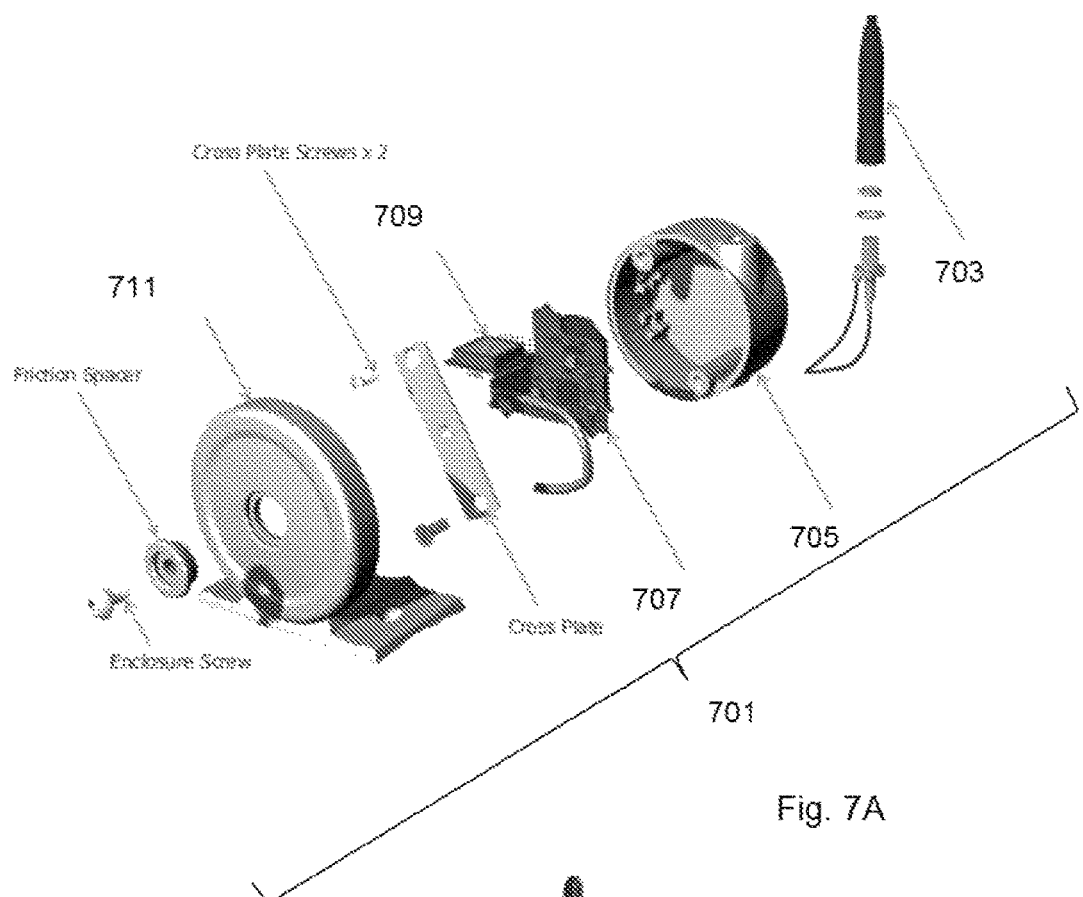
FIGS. 7A and 7B show an exploded view and an assembled view of an RF and GPS device according to the present disclosure.

FIG. 7A shows an exploded view of an RF and GPS device 701 called an "eTag", which is fitted to the marine vessel as part of the mooring system.

The eTag has a RF antenna 703, which has both an external and internal portion. The antenna is fitted to an enclosure body 705, which holds an electronics module 707.

Optionally, the electronics module 707 has a GPS device 709 arranged to detect the location of the eTag, and so detect the location of the marine vessel using the eTag.

The electronics module has a controller arranged to control the optional GPS device 709 and the RF antenna 703. The electronics module is powered from the marine vessel's power source, such as a battery.

Figure 7B:
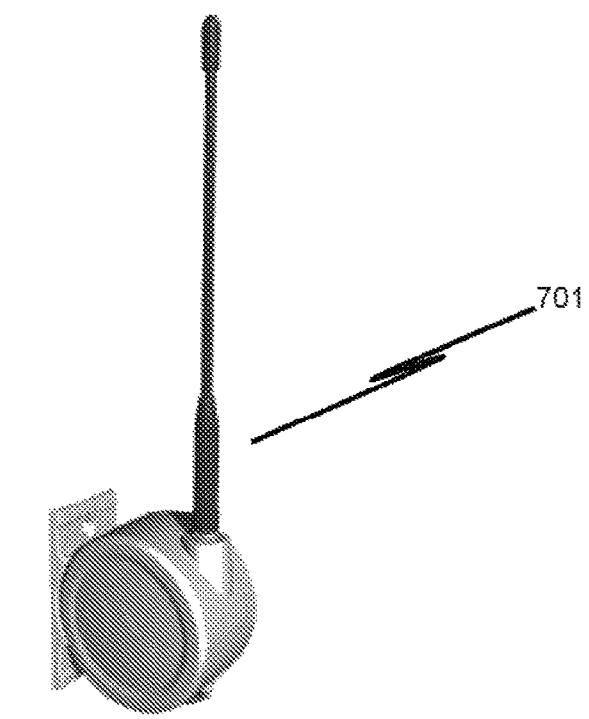

An enclosure mount 711 attaches to the enclosure body 705 to enclose the electronics module 707 inside the body of the eTag. The enclosure mount has a mounting surface for mounting the eTag in a prominent position in the marine vessel to enable the eTag to communicate externally from the marine vessel. FIG. 7B shows an assembled view of the eTag 701.

The RF antenna 703 on the eTag is compatible for communicating with the RF antenna 403 on the mooring buoy.

The eTag may be mounted externally to a high and clear point on the boat to maximize signal range surrounding the boat. For example, this could be on the fly bridge, windscreen, bulkhead or on mast type structures.

The mounting surface could be flat, round or curved and may be at any angle between horizontal and vertical. Therefore it will be understood that any suitable mounting option may be used.

The external RF antenna may be mounted vertically and the internal GPS antenna may be oriented vertically as well. As the relationship of these two may be fixed, the RF antenna may be used to set the correct orientation of both.

The eTag may be powered with 12 VDC from the boat via a cable, for example with a cigarette lighter compatible plug.

Figure 8:
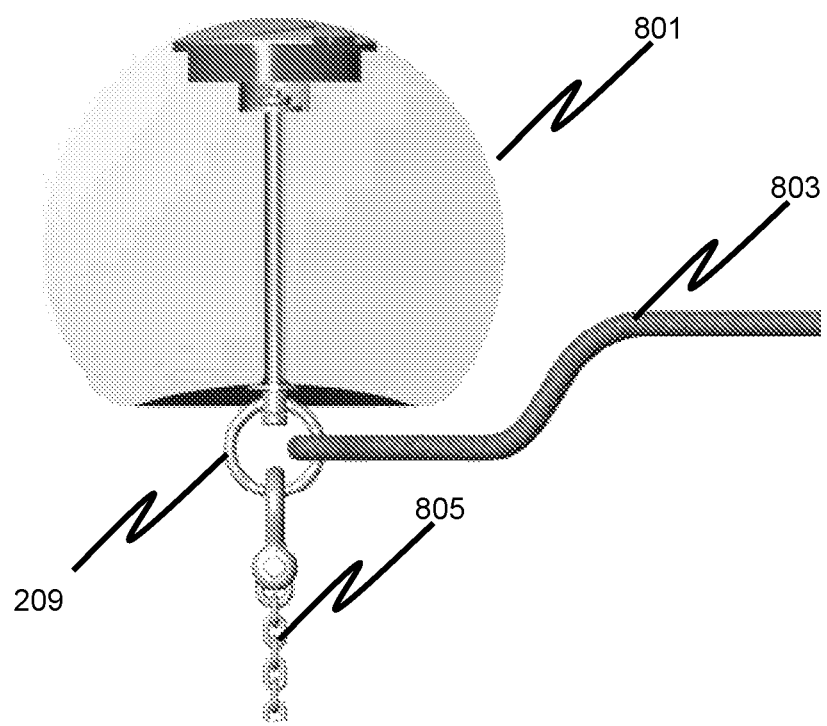
FIG. 8 shows an internal view of a mooring buoy according to the present disclosure.

FIG. 8 shows an internal view of the mooring buoy 801 connected to a mooring line 803 that may be used to attach the buoy to a marine vessel. The mooring buoy is weighed down by a weighted chain 805 that is attached to the attachment point 209.

Figure 9A:
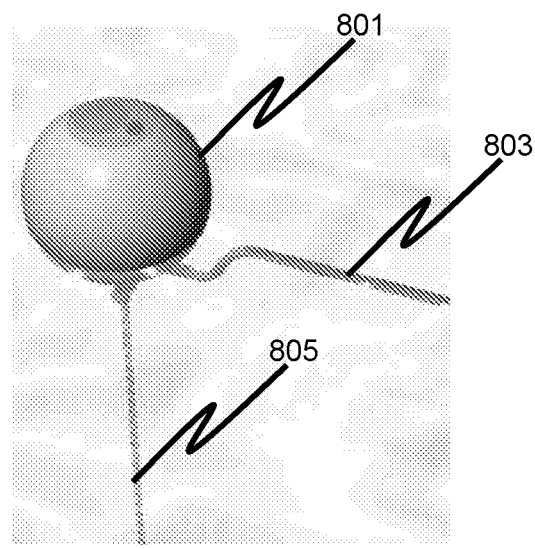
FIG. 9A shows a mooring buoy in an idle position according to the present disclosure.
Figure 9B:
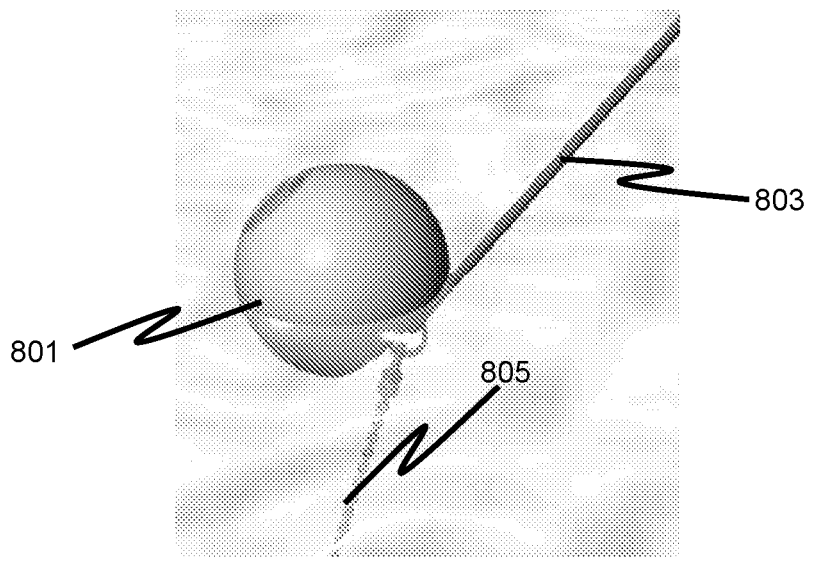
FIG. 9B shows a mooring buoy in a mooring position according to the present disclosure.

FIG. 9A and FIG. 9B show the mooring buoy 801 in use. In particular, FIG. 9A shows the mooring buoy at a rest position and FIG. 9B shows the mooring buoy in a moored position when a marine vessel is moored to the buoy.

In FIG. 9A, the buoy 801 is floating in the water with the weight of the chain 805 keeping the mooring buoy upright. The mooring line 803 is not attached to a mooring vessel and so does not cause the mooring buoy to change orientation.

In FIG. 9B, the buoy 801 is still floating in the water with the weight of the chain 805 pulling the mooring buoy downwards. However, the mooring line 803 attached to the attachment point is also now attached to a mooring vessel and causes the mooring buoy to change orientation. That is, the mooring line extends upwards towards the marine vessel attached to it and is forced against the circumference of the concave indentation 111 on the mooring buoy causing the buoy to shift its vertical orientation.

That is, the attachment point location causes the body of the mooring buoy to tilt in the water upon the mooring vessel being attached to the attachment point. The movement sensor is arranged to detect when the body tilts from a rest position to a mooring position, e.g. a tilt position. This mooring position indicates that a marine vessel is moored to the mooring buoy. Optionally, the controller in the buoy may only determine a mooring position has occurred upon detecting that the buoy has been in the moored position for a defined period of time, such as 5 seconds for example. This therefore reduces the risk of a false mooring indication.

According to one example, the movement sensor is a tilt sensor in the form of an accelerometer. It will be understood that the movement sensor may be any other suitable type of movement sensor, such as a magnetometer, a gyroscope or a reed switch mechanism, for example.

According to one example, the visual and/or audible indicators on the buoy may be controlled under operation of the buoy controller to emit a visual and/or audible signal to indicate a status of the mooring buoy. For example, the status may include a marine vessel not being moored to the mooring buoy, a marine vessel being moored to the mooring buoy, the mooring buoy not having been booked by any marine vessel, the mooring buoy having been booked by any marine vessel, the vessel ID being associated with the mooring buoy, the vessel ID not being associated with the mooring buoy, or indeed any other suitable status.

According to one example, the detection of a mooring position by the movement sensor causes the controller in the buoy to activate the RF communication device on the buoy and so initiate a communication channel between the buoy and the vessel RF communication device in the eTag. This communication channel may enable the buoy to receive the vessel ID of the vessel from the vessel RF communication device.

According to one example, the RF communication device is activated periodically by the controller in the buoy to determine whether a vessel RF communication device in an eTag is in close proximity. If the controller in the buoy determines that the vessel RF communication device is in close proximity, the controller may then initiate a communication channel between the RF communication device in the buoy and the vessel RF communication device in the eTag. This communication channel may then enable the buoy to receive the vessel ID of the vessel from the vessel RF communication device.

According to one example, upon a vessel being attached to the buoy (as shown in FIG. 9B), the controller in the buoy may detect the output of the movement sensor to determine that the buoy is in a mooring position. The mooring position indicates that a vessel has been moored to the buoy. The subsequent or prior identification of the received vessel ID at the buoy enables the controller in the buoy to determine whether the moored vessel is a vessel that has booked the mooring buoy.

According to one example, the cellular antenna of the buoy is arranged to communicate with an external booking system over a cellular network under operation of the controller. These communications may occur at predefined regular intervals.

The controller may be arranged to transmit a mooring buoy ID to the booking system and receive booking data from the booking system via the cellular antenna. The mooring buoy ID uniquely identifies that particular buoy. The booking data may include at least one booking vessel ID associated with the mooring buoy ID. The booking data may also include time, date and location data.

The RF communication device on the buoy may be arranged to receive the vessel ID associated with the marine vessel either before or after the vessel has moored. The controller may be arranged to compare the received booking vessel ID with the received vessel ID to determine whether the vessel ID is associated with the mooring buoy, e.g. to determine whether the mooring buoy has been allocated to the marine vessel, or the marine vessel has been booked for mooring to the buoy via the booking system.

Figure 10:
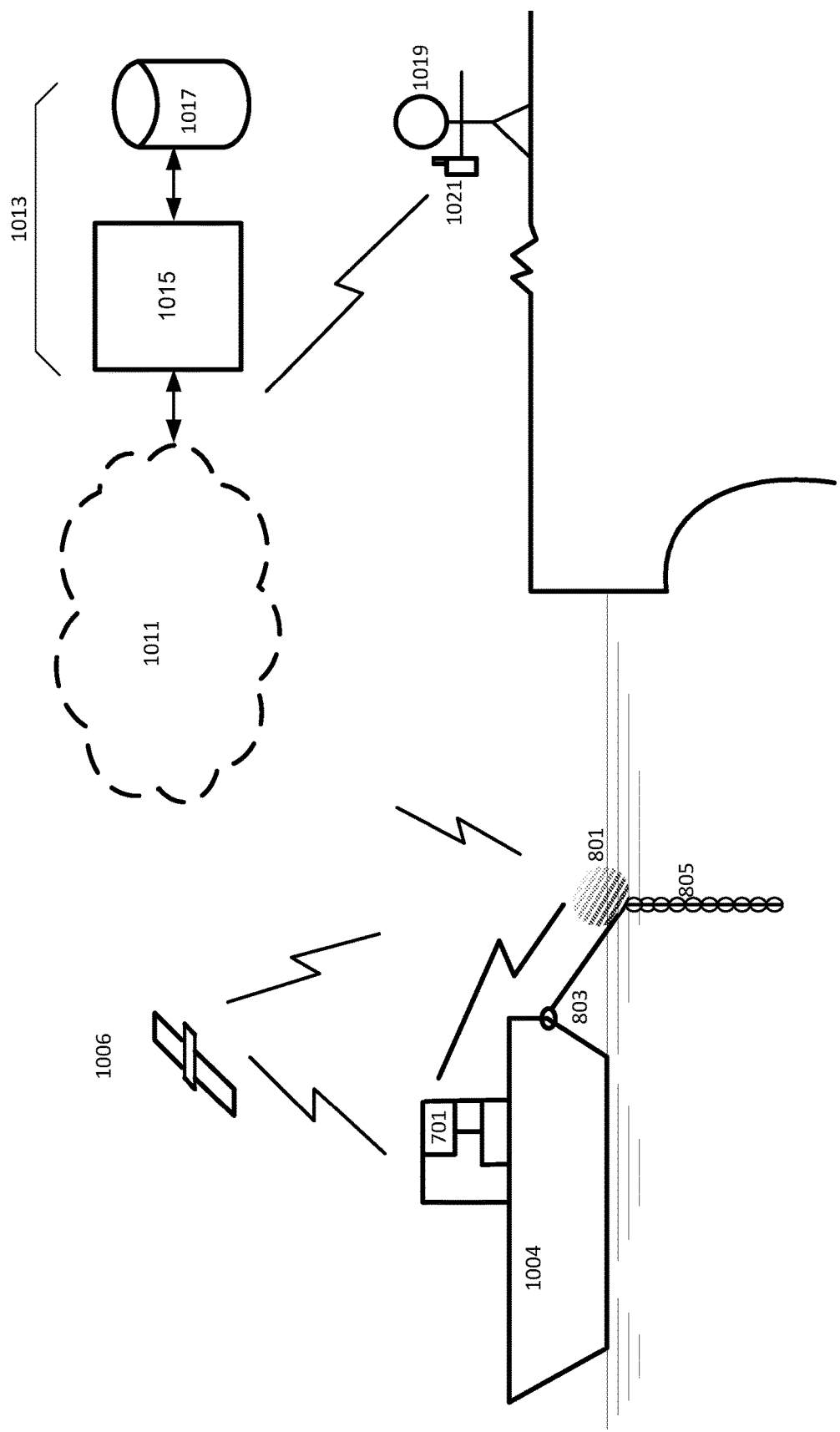
FIG. 10 shows a mooring system according to the present disclosure.

FIG. 10 shows an intelligent mooring system according to the present disclosure. According to this example, the mooring buoy 801 includes a cellular antenna under control of the controller in the mooring buoy arranged to communicate with a booking system over a cellular network to obtain at least one booking vessel ID from the booking system. Optionally, the mooring buoy may have a GPS device to provide further GPS functionality as described herein.

The mooring system has a vessel RF communication device located in an eTag 701 as described herein positioned on a marine vessel. The booking system is arranged to receive booking data which includes at least a vessel ID associated with the marine vessel as discussed herein.

The vessel RF communication device is arranged to transmit the vessel ID to the RF communication device on the buoy.

The RF communication device on the buoy is arranged to receive the vessel ID upon the movement sensor detecting a mooring position.

The controller in the buoy is arranged to determine whether the obtained booking vessel ID is associated with the at least one mooring buoy based on the received vessel ID.

Upon a determination by the controller in the buoy that the obtained booking vessel ID is not associated with the mooring buoy based on the received vessel ID, the visual and/or audible indicator is arranged by the controller to emit a visual and/or audible signal.

The mooring buoy may have a unique ID that is transmitted to the booking system on a periodic basis to obtain at least one booked vessel ID from the booking system.

It will be understood that a unique ID for each buoy may not be required for small marinas where selective booking of individual buoys may not be required.

For booking of specific marina locations, i.e. booking of specific buoys, the buoys may however require unique IDs. This buoy unique ID would be sent from the buoy to the booking system as described herein.

It will be understood that the buoy unique ID and marine vessel ID may be sent in a separate or the same communication to the booking system.

The booking system 1013 has a web server 1015 connected to a booking database 1017. The web server provides a portal to a web page that enables a user 1019 to access the booking system via any suitable electronic or computing device 1021, such as a mobile telephone, tablet, PC etc.

For example, a user may use a mobile telephone with a suitable software programming application (called an "App") stored thereon. The mobile telephone may connect to the web server 1015 via the Internet 1011 using a cellular data connection or a Wi-Fi data connection. The web page is served to the browser on the mobile telephone to enable the user to access the booking system.

The user is able to create a user profile and upload user data associated with the user, such as their name, telephone number, payment details, contact address, marine vessel ID, desired mooring location, and desired mooring date, time and period.

Based on this information, the booking system may allocate a mooring buoy to the user for that specific vessel ID and store the information in the database 1017 for later access by the booking system. Some or all of this information may be transmitted to the mooring buoy 801.

According to one example, when a user logs in to the booking system, a map screen is displayed on the user's device indicating the location of all buoys that are registered to the booking system, along with data that indicates the latitude/longitude position and identification details. Alternatively, the screen may show a text list of the registered buoys with details of their location, position and/or identification details.

For a user to book a particular buoy, the user may select a buoy on the screen. Upon selecting the buoy, the colour of the buoy on the map screen may change to indicate the selection. Upon the user confirming the booking, a message is sent to the user.

When the user is on their boat and is attempting to locate the buoy, they may access the App to determine the position of their current location in relation to the position of the buoy. The buoy position may be a real time GPS location, last known GPS location, or may be a known physical location as determined by the marina operators. If the user uses a mobile device with an accelerometer, the user may use the App to determine the direction in which to travel to approach the buoy.

Upon locating the buoy, the user moors up to the buoy and the buoy detects its mooring position and performs its vessel ID checks as described herein.

Figure 11:
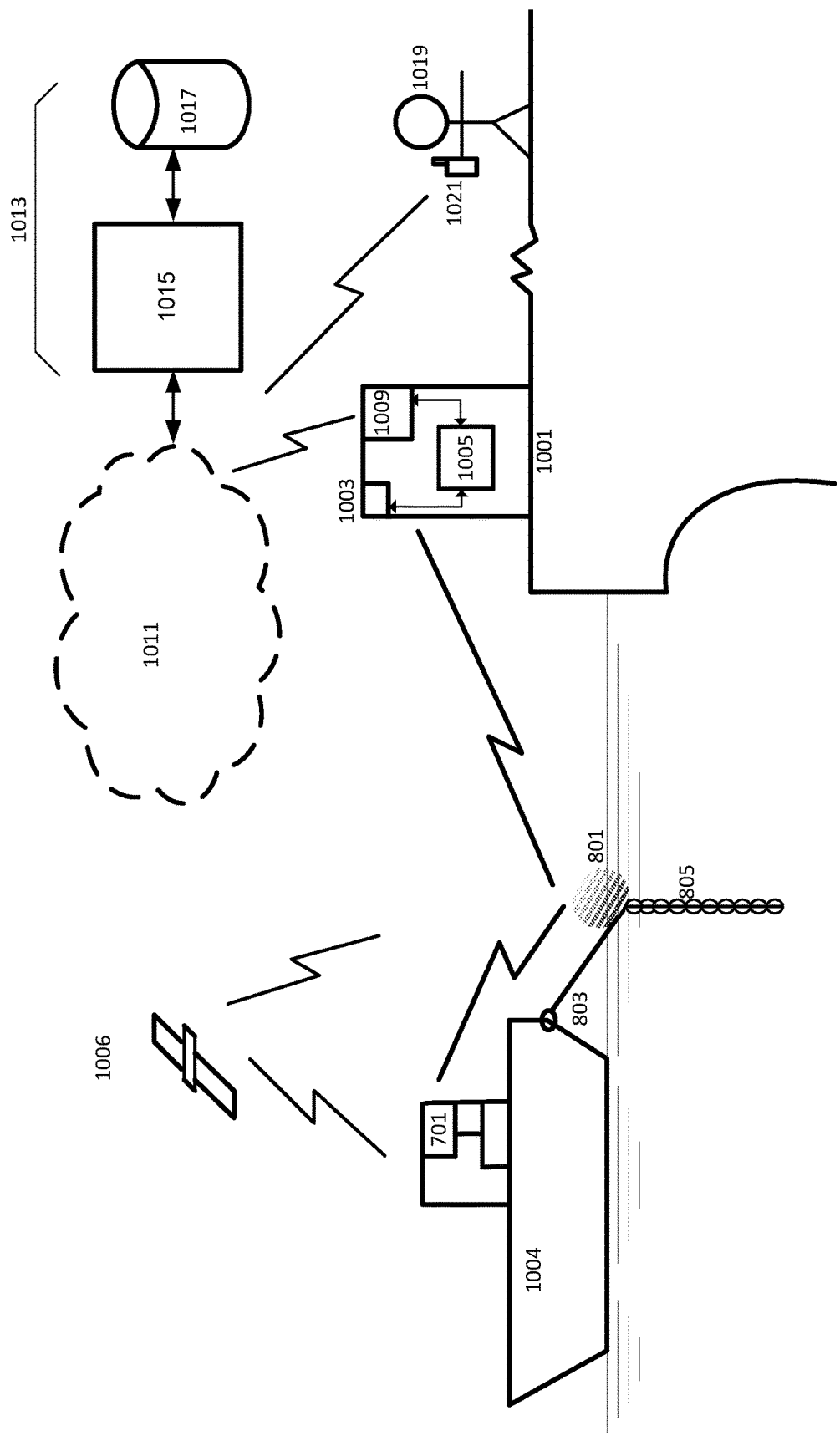
FIG. 11 shows a mooring system according to the present disclosure.

FIG. 11 shows an intelligent mooring system according to the present disclosure. In this example, the mooring buoy does not have a GPS device or a cellular antenna.

The mooring system has a central control system 1001 that has a central RF communication device 1003 and a transceiver 1009 under control of a central controller 1005. The transceiver 1009 communicates with the booking system 1013 via the Internet 1011. The mooring system also has a vessel RF communication device in an eTag 701 located on the marine vessel. The booking system is arranged to receive booking data that includes at least a vessel ID associated with the marine vessel as described herein in relation to FIG. 10.

The vessel RF communication device is arranged to transmit the vessel ID to the RF communication device on the buoy. The buoy RF communication device is arranged to receive the vessel ID and subsequently transmit the received vessel ID to the central RF communication device. The central RF communication device is arranged to receive the vessel ID from the RF communication device on the buoy and subsequently transmit the received vessel ID to the booking system. The booking system is further arranged to receive the vessel ID from the central RF communication device and determine whether the vessel ID is associated with the at least one mooring buoy. For example, the booking system may determine whether the mooring buoy has been allocated to the marine vessel, or in other words, the marine vessel has been booked for mooring to the buoy via the booking system.

The booking data may include further booking information such as one or more of a time period, a date, an account ID and payment data.

The booking system may send the determination of whether the vessel ID is associated with the at least one mooring buoy to the central controller. Under control of the central controller, the central RF communication device sends a control signal to the RF communication device on the buoy to indicate the determination made by the booking system.

The controller in the mooring buoy may activate the visual and/or audible indicators to emit a visual and/or audible signal if the control signal indicates that a determination was made that the vessel ID is not associated with the mooring buoy.

It will be understood that, for booking of specific marina locations, i.e. booking of specific buoys, the buoys may require unique IDs. This buoy unique ID would be sent from the buoy to the booking system as described herein. It will be understood that the buoy unique ID and marine vessel ID may be sent in a separate or the same communication to the booking system.

Therefore, the mooring buoy may have a unique ID that is transmitted to the booking system. For example, the unique ID may be transmitted from the buoy to the central RF communication device, which then transmits the ID to the booking system. These transmissions between the buoy and the booking system may be on a periodic basis in order to obtain one or more booked vessel IDs from the booking system that are associated with the buoy ID.

According to one example, the mooring system has a mooring buoy booking control system 1001, which is located on land in the marina where the mooring buoy is located. The booking control system 1001 has a central RF communication device 1003 that is arranged to communicate with the RF communication device 403 on the buoy. Optionally, the central RF communication device 1003 may also communicate with the RF communication device in the eTag 701 on the marine vessel 1004. The eTag 701 obtains a GPS reference from a satellite 1006 using its GPS device. The booking control system also has a central controller 1007 that controls the RF communication device 1003 and a transceiver 1009. The transceiver 1009 may be a cellular or Wi-Fi transceiver that connects to the Internet 1011 to access a booking system 1013.

The booking system 1013 has a web server 1015 connected to a booking database 1017. The web server provides a portal to a web page that enables a user 1019 to access the booking system via any suitable electronic or computing device 1021, such as a mobile telephone, tablet, PC etc.

For example, a user may use a mobile telephone with a suitable software programming application (called an "App") stored thereon. The mobile telephone may connect to the web server 1015 via the Internet 1011 using a cellular data connection or a Wi-Fi data connection. The web page is served to the browser on the mobile telephone to enable the user to access the booking system.

The user is able to create a user profile and upload user data associated with the user, such as their name, telephone number, payment details, contact address, marine vessel ID, desired mooring location, and desired mooring date, time and period.

Based on this information, the booking system may allocate a mooring buoy to the user for that specific vessel ID and store the information in the database 1017 for later access by the booking system. Some or all of this information may be transmitted to the booking control system 1001 and/or the mooring buoy 801.

According to one example, when a user logs in to the booking system, a map screen is displayed on the user's device indicating the location of all buoys that are registered to the booking system, along with data that indicates the latitude/longitude position and identification details. Alternatively, the screen may show a text list of the registered buoys with details of their location, position and/or identification details.

For a user to book a particular buoy, the user may select a buoy on the screen. Upon selecting the buoy, the colour of the buoy on the map screen may change to indicate the selection. Upon the user confirming the booking, a message is sent to the user.

When the user is on their boat and is attempting to locate the buoy, they may access the App to determine the position of their current location in relation to the position of the buoy. The buoy position may be a real time GPS location, last known GPS location, or may be a known physical location as determined by the marina operators. If the user uses a mobile device with an accelerometer, the user may use the App to determine the direction in which to travel to approach the buoy.

Upon locating the buoy, the user moors up to the buoy and the buoy detects its mooring position and performs its vessel ID checks as described herein.

According to one example, when a vessel that has booked a buoy moves near to the booked buoy, proximity of the vessel is detected by the RF communication device in the buoy. The controller in the buoy is then arranged to receive the vessel ID from the vessel RF communication device located on the marine vessel via the RF communication device on the buoy.

According to one example, if the buoy has been booked, the vessel ID of the vessel that is booked for that buoy (the booked vessel ID) is transmitted from the booking system to the buoy via the central control system. The buoy stores the booked vessel ID. When the controller in the buoy detects a match between the vessel ID transmitted from the vessel and the stored booked vessel ID, the controller in the buoy may cause the audible and/or visual indicators in the buoy to activate to assist the user in locating the buoy. The buoy may also store date and time data associated with the booking if this is transmitted from the booking system. The date and time data may also be used by the controller to cause the audible and/or visual indicators to activate in a booking time period to assist the user in locating the buoy at the time the buoy has been booked.

According to one example, the buoy may receive the vessel ID from the vessel and transmit the received vessel ID to the central RF communication device of the central control system to check the validity of the vessel ID in real time. The RF communication device in the buoy may then receive a signal from the central RF communication device of the central control system to indicate whether or not the marine vessel has been booked for mooring to the buoy. For example, the central control system may store the vessel ID for that mooring buoy locally, or may send an enquiry to the booking system to ascertain whether the vessel ID is associated with that particular mooring buoy. The controller in the central control system may then send a booking control signal to the buoy (via the two RF communication devices) indicating whether or not the buoy near the vessel has been allocated to that vessel. When the controller in the buoy detects from the booking control signal that the buoy is allocated to the vessel, the controller may cause the audible and/or visual indicators to activate to assist the user in locating the buoy.

Alternatively, when the controller in the buoy detects from the booking control signal that the buoy is not allocated to the vessel, the controller may cause the audible and/or visual indicators to activate to warn the user that the buoy has not been allocated to the vessel.

It will be understood that other mechanisms may be used to enable the controller in the buoy to make a determination of whether the buoy is allocated to a proximate vessel.

It will be understood that the GPS device in the buoy may remove the requirement for individual buoys to have unique buoy IDs. That is, the GPS location of a buoy in association with the known position of the buoys in the marina as stored in the database is sufficient to identify the buoys.

Further, the GPS position of the buoys may be used by the mooring buoy booking control system or booking system to determine when one of the buoys has become detached. For example, a geo-fencing algorithm may be operated by the controller 1005 or the web server 1015 to detect when one or more buoy locations move outside a defined area. A determination by the controller or web server that a buoy has moved outside of a defined area may then result in an alarm being operated to enable a marine worker to identify the problem. Further, a visual and/or audible indicator on the buoy may be activated by sending an alarm control signal from the central RF communication device 1003 to the buoy RF communication device, or from the web server to the cellular antenna of the buoy. When the controller in the buoy detects that an alarm control signal has been received (indicating that the buoy is detached), the controller may activate the audible and/or visual indicators to assist the marine worker in locating the detached buoy.

According to one example, upon the movement sensor subsequently detecting that the buoy is no longer in a mooring position, a signal may be sent to the booking system 1013 (either directly via the cellular antenna of the buoy or via the booking control system 1001) to indicate that the vessel is no longer moored to the buoy. This indication may then enable the booking system to indicate that the particular buoy is now available for further bookings.

Figure 12A:
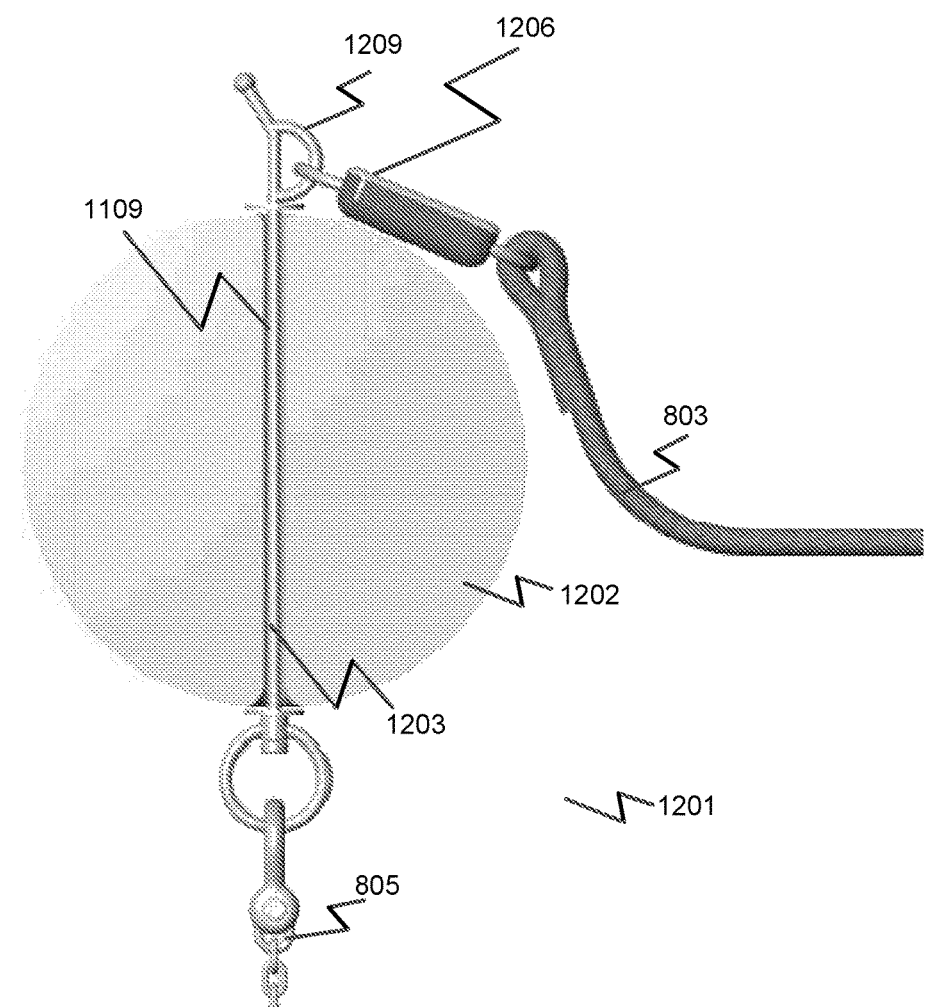
FIGS. 12A to 12C show a mooring system according to an alternative embodiment of the present disclosure.

Referring to FIG. 12A, an alternative arrangement is shown. According to this arrangement, the mooring buoy 1201 includes a buoyant body 1202 with an aperture 1109 passing through it. A bar 1203 passes through the aperture and at one distal end (the lower end) has a chain 805 attached. At a second distal end, an eye 1209 of the bar 1203 is used to attach an electronics module 1206, whereupon connection the electronic module forms part of the mooring buoy 1201. The electronics module 1206 includes a casing that has enclosed therein the electronics for both detecting movement as discussed above and for communicating with the booking system and vessel as discussed above as well as a solar power module. The casing includes a first attachment element for pivotally attaching to the eye 1209 of the bar 1203, and a second attachment element for pivotally attaching to the mooring line 803.

The buoyant body is constructed in a conventional sense with a special eyelet at the top. The electronic module is constructed around a stainless steel link which is attached to the buoyant body. The mooring line is attached to the other end of the electronic module. When the line is pulled taught and substantially vertical by a boat mooring on the line, the electronic module is rotated up (i.e. rotated about the top of the buoyant body) between 45 and 90 degrees, which activates an internal position sensitive switch. This position is never reached when idle so a positive mooring event is logged and transmitted. A time delay with switch polling may be used to confirm a mooring condition. The vertical rod at the top ensures the module is always oriented with the solar cells facing upwards.

Figure 12C:
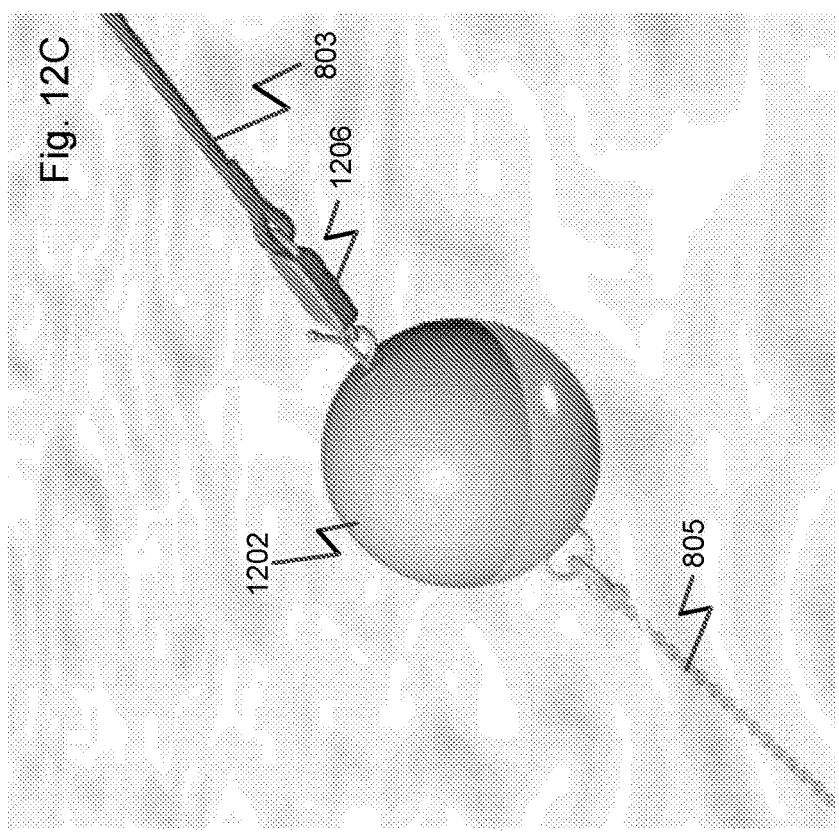
Figure 12B:
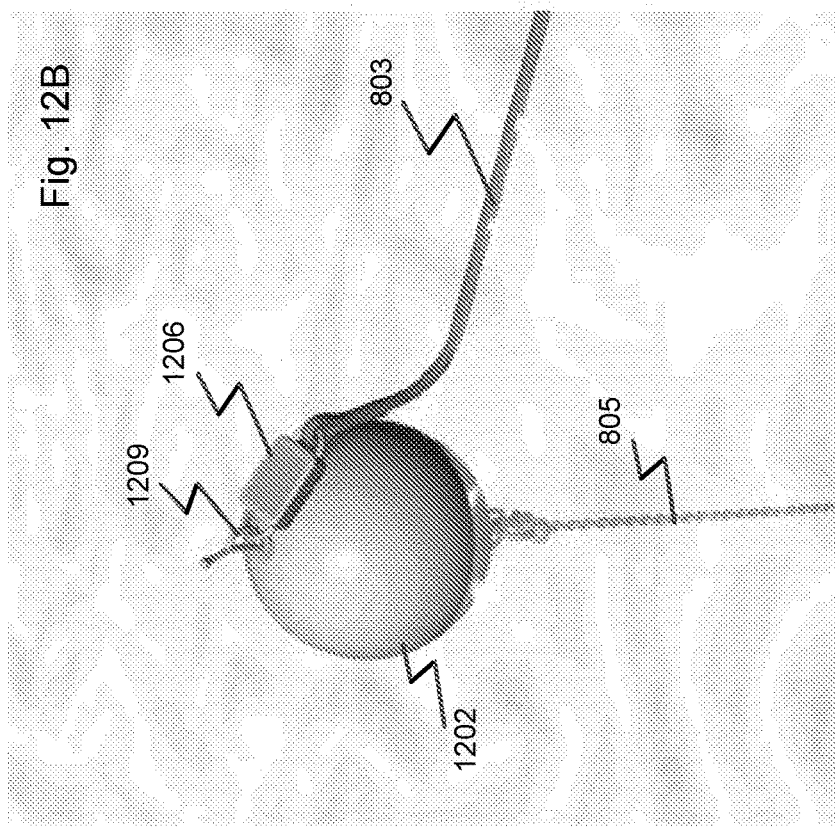

This system works as shown in FIGS. 12B and 12C, and in a similar manner to the other buoy systems as described herein. However, it becomes easier to replace either the buoyant body 1202 or the electronics module 1206. Further, it is also possible to retrofit the electronics module 1206 to an existing buoyant body 1202.

Figure 13A:
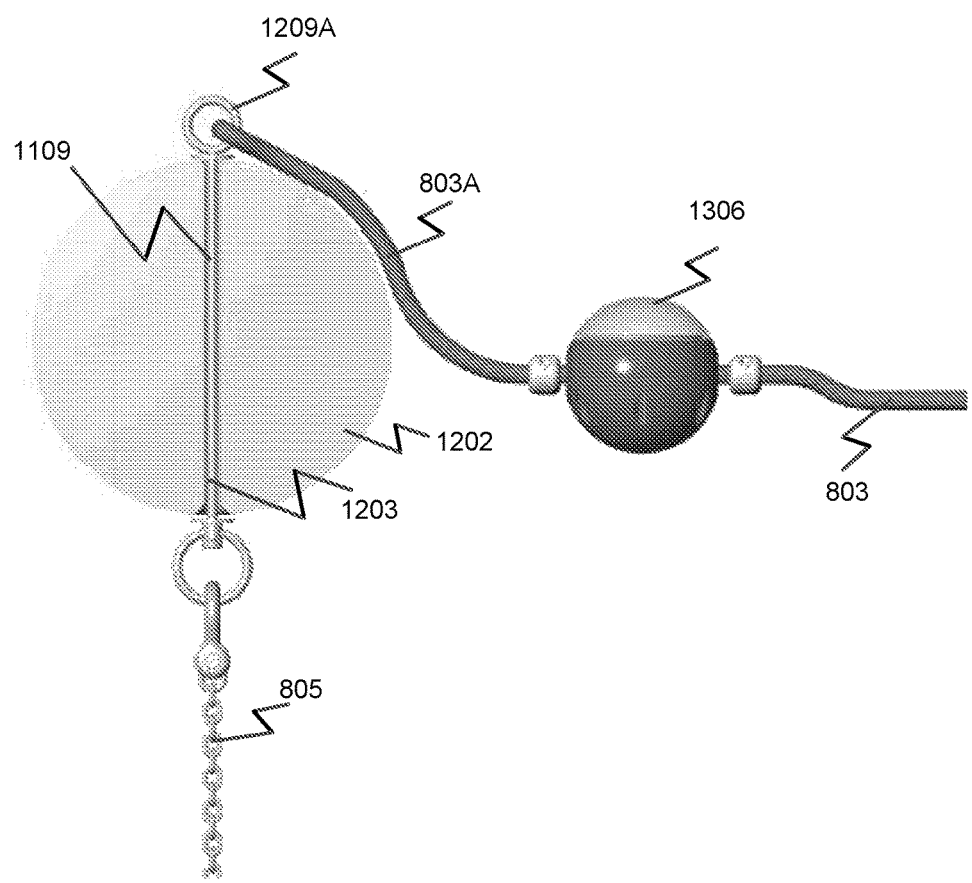

Referring to FIG. 13A, a further alternative arrangement is shown. According to this arrangement, the mooring buoy 1301 includes a buoyant body 1202 with an aperture 1109 passing through it. A bar 1203 passes through the aperture and at one distal end (the lower end) has a chain 805 attached. At a second distal end, an eye 1209A of the bar 1203 is used to attach an electronics module 1306 via a mooring line portion 803A, whereupon connection the electronic module 1306 forms part of the mooring buoy 1301. The electronics module 1306 includes a casing that has enclosed therein the electronics for both detecting movement as discussed above and for communicating with the booking system and vessel as discussed above as well as a solar power module. The casing includes a first attachment element fixedly attached to one end of the mooring line portion 803A (with the other end attached to the eye 1209A), and a second attachment element for fixedly attaching to the mooring line 803.

The buoyant body is constructed in a conventional sense with a through bar. The electronic module is constructed around the mooring line and is free to revolve. Two travel limiters are also attached to the mooring line. The electronic module is weighted and buoyed to float upright. When the line is pulled taught and substantially vertical by a boat mooring on the line, the module is rotated up by between 45 and 90 degrees or more (i.e. rotated about the top of the buoyant body), which activates an internal position sensitive switch. This position is never reached when idle so a positive mooring event is logged and transmitted. A time delay with switch polling may be used to confirm a mooring condition.

This system works as shown in FIGS. 13B and 13C, and in a similar manner to the other buoy systems as described herein. However, as with the system described in FIGS. 12A to 12C, it becomes easier to replace either the buoyant body 1202 or the electronics module 1306. Further, it is also possible to retrofit the electronics module 1306 to an existing buoyant body 1202.

According to another example, it will be understood that where a mooring buoy includes an RF communication device for communicating, that the communication device may be used to communicate with other communication devices on other buoys that are within communication distance. This forms a network mesh of interconnected buoy communication systems to be deployed. By utilising a communication mesh, the communications received at one mooring buoy may be effectively transmitted onwards to further mooring buoys and directed towards a mooring buoy that has a direct connection to an on land communication system. This then enables the communications to be forwarded to any other suitable device (including the booking system) via standard network communication mechanisms. This will remove the need for the mooring buoy to include an antenna in order to communicate with the booking system (or indeed any other system not located locally).

Various other aspects are described according to the following clauses.

CLAUSE 1: A mooring buoy comprising a buoyant body, an attachment point for attaching the buoy to a marine vessel, a controller, an RF communication device for receiving a vessel ID identifying the marine vessel and a movement sensor, wherein the controller is arranged to determine when the marine vessel is moored to the mooring buoy based on the received vessel ID and the movement sensor.

CLAUSE 2: The buoyant body may have an upper body portion and lower body portion, wherein the lower portion is arranged to be submerged in use and the attachment point is attached to the lower body portion and arranged to attach to the marine vessel. The location of the attachment point may cause the body of the mooring buoy to tilt in the water upon the mooring vessel being attached to the attachment point.

CLAUSE 3: The RF communication device may be arranged to receive the vessel ID associated with the marine vessel from a vessel RF communication device located on the marine vessel.

CLAUSE 4: The mooring buoy may have a cellular antenna arranged to communicate with an external booking system over a cellular network. The controller may be further arranged to transmit a mooring buoy ID to the booking system and receive booking data from the booking system via the cellular antenna, wherein the booking data may have at least one booking vessel ID associated with the mooring buoy ID. The controller may be arranged to activate the RF communication device to receive the vessel ID upon detecting via the movement sensor that the buoy is in a mooring position, and the controller may be further arranged to compare the received booking vessel ID with the received vessel ID to determine whether the vessel ID is associated with the mooring buoy.

CLAUSE 5: The controller may be arranged to activate the RF communication device to receive the vessel ID upon detecting via the movement sensor that the buoy is in a mooring position, and the controller may be further arranged to communicate the vessel ID to the booking system via the cellular antenna. The cellular antenna may be further arranged to receive a signal from the booking system to indicate whether or not the vessel ID is associated with the mooring buoy.

CLAUSE 6: The controller may be arranged to activate the RF communication device to receive the vessel ID upon detecting via the movement sensor that the buoy is in a mooring position. The RF communication device may be further arranged to transmit the received vessel ID to a central RF communication device of a mooring buoy booking control system. The RF communication device may be further arranged to receive a signal from the central RF communication device of the mooring buoy booking control system to indicate whether or not the marine vessel has been booked for mooring to the buoy via a booking system. The mooring buoy may have a visual and/or audible indicator arranged to emit a visual and/or audible signal, wherein the visual and/or audible indicator may be arranged to emit the visual and/or audible signal upon the controller determining that the marine vessel moored to the buoy has not been booked for mooring to the buoy via the booking system.

CLAUSE 7: The mooring buoy may have a visual and/or audible indicator arranged to emit a visual and/or audible signal to indicate a status of the mooring buoy, wherein the status may comprise one, or a combination of, a marine vessel not being moored to the mooring buoy, a marine vessel being moored to the mooring buoy, the mooring buoy not having been booked by any marine vessel, the mooring buoy having been booked by any marine vessel, the vessel ID is associated with the mooring buoy and the vessel ID is not associated with the mooring buoy.

CLAUSE 8: The movement sensor may be arranged to detect when the buoyant body moves from a rest position to a mooring position, wherein the mooring position indicates that a marine vessel is moored to the mooring buoy. The mooring position may be obtained by a mooring line of a marine vessel being attached to the attachment point. The mooring buoy may have a GPS device arranged to detect a position of the mooring buoy.

CLAUSE 9: A mooring system comprising at least one mooring buoy as described in clause 1, a vessel RF communication device located on a marine vessel, and a booking system, wherein the booking system is arranged to receive booking data comprising at least a vessel ID associated with the marine vessel, wherein the vessel RF communication device is arranged to transmit the vessel ID to the RF communication device of the mooring buoy, wherein the RF communication device of the mooring buoy is arranged to receive the vessel ID upon the movement sensor detecting a mooring position, wherein the mooring buoy further comprises a cellular antenna arranged to communicate with the booking system over a cellular network to obtain at least one booking vessel ID from the booking system, wherein the controller in the buoy is further arranged to determine whether the obtained booking vessel ID is associated with the at least one mooring buoy based on the received vessel ID.

CLAUSE 10: The mooring buoy may have a visual and/or audible indicator, whereupon a negative determination that the obtained booking vessel ID is associated with the at least one mooring buoy based on the received vessel ID, the visual and/or audible indicator is arranged to emit a visual and/or audible signal. The at least one mooring buoy may have a unique ID that is transmitted to the booking system on a periodic basis to obtain the at least one booked vessel ID from the booking system.

INDUSTRIAL APPLICABILITY

The arrangements described are applicable to the marine vessel and boating industries.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

What is claimed is:

1. A mooring buoy comprising a buoyant body, an attachment point for attaching the buoy to a marine vessel, a controller, an RF communication device for receiving a vessel ID identifying the marine vessel and a movement sensor for detecting orientation of the mooring buoy, wherein the controller is configured to determine when the marine vessel is moored to the mooring buoy based on the received vessel ID and an output of the movement sensor, wherein the buoyant body comprises an upper body portion and a lower body portion, wherein the lower body portion is configured to be at least partially submerged in use and the attachment point is attached to the lower body portion for mooring the marine vessel to the attachment point, wherein a location of the attachment point on the mooring buoy causes the body of the mooring buoy to tilt in the water upon the mooring vessel being moored to the attachment point.

2. The mooring buoy of claim 1, wherein the RF communication device is configured to receive the vessel ID associated with the marine vessel from a vessel RF communication device located on the marine vessel.

3. The mooring buoy of claim 1 further comprising a communication antenna configured to communicate with an external booking system over a communication network.

4. The mooring buoy of claim 3, wherein the controller is further configured to transmit a mooring buoy ID to the booking system and receive booking data from the booking system via the cellular antenna, wherein the booking data comprises at least one booking vessel ID associated with the mooring buoy ID.

5. The mooring buoy of claim 4, wherein the controller is configured to activate the RF communication device to receive the vessel ID upon detecting via the movement sensor that the buoy is in a mooring position, and the controller is further configured to compare the received booking vessel ID with the received vessel ID to determine whether the vessel ID is associated with the mooring buoy.

6. The mooring buoy of claim 3, wherein the controller is configured to activate the RF communication device to receive the vessel ID upon detecting via the movement sensor that the buoy is in a mooring position, and the controller is further configured to communicate the vessel ID to the booking system via the cellular antenna.

7. The mooring buoy of claim 6, wherein the antenna is further configured to receive a signal from the booking system to indicate whether or not the vessel ID is associated with the mooring buoy.

8. The mooring buoy of claim 1, wherein the controller is configured to activate the RF communication device to receive the vessel ID upon detecting via the movement sensor that the buoy is in a mooring position.

9. The mooring buoy of claim 8, wherein the RF communication device is further configured to transmit the received vessel ID to a central RF communication device of a mooring buoy booking control system.

10. The mooring buoy of claim 9, wherein the RF communication device is further configured to receive a signal from the central RF communication device of the mooring buoy booking control system to indicate whether or not the marine vessel has been booked for mooring to the buoy via a booking system.

11. The mooring buoy of claim 10 further comprising a visual and/or audible indicator configured to emit a visual and/or audible signal, wherein the visual and/or audible indicator is configured to emit the visual and/or audible signal upon the controller determining that the marine vessel moored to the buoy has not been booked for mooring to the buoy via the booking system.

12. The mooring buoy of claim 1 further comprising a visual and/or audible indicator configured to emit a visual and/or audible signal to indicate a status of the mooring buoy, wherein the status comprises one, or a combination of, a marine vessel not being moored to the mooring buoy, a marine vessel being moored to the mooring buoy, the mooring buoy not having been booked by any marine vessel, the mooring buoy having been booked by any marine vessel, the vessel ID is associated with the mooring buoy and the vessel ID is not associated with the mooring buoy.

13. The mooring buoy of claim 1, wherein the movement sensor is configured to detect when the buoyant body moves from a rest position to a mooring position, wherein the mooring position indicates that a marine vessel is moored to the mooring buoy.

14. The mooring buoy of claim 13, wherein the mooring position is obtained by a mooring line of a marine vessel being attached to the attachment point.

15. The mooring buoy of claim 14 further comprising a GPS device configured to detect a position of the mooring buoy.

16. A mooring system comprising at least one mooring buoy as claimed in claim 1, a vessel RF communication device located on a marine vessel, and a booking system,
wherein the booking system is configured to receive booking data comprising at least a vessel ID associated with the marine vessel,
wherein the vessel RF communication device is configured to transmit the vessel ID to the RF communication device of the mooring buoy,
wherein the RF communication device of the mooring buoy is configured to receive the vessel ID upon the movement sensor detecting a mooring position,
wherein the mooring buoy is further configured to communicate with the booking system over a communication network to obtain at least one booking vessel ID from the booking system,
wherein the controller in the buoy is further configured to determine whether the obtained booking vessel ID is associated with the at least one mooring buoy based on the received vessel ID.

17. The mooring system of claim 16, wherein the mooring buoy further comprises a visual and/or audible indicator, and, upon a negative determination, the visual and/or audible indicator is configured to emit a visual and/or audible signal.

18. The mooring system of claim 16, wherein the at least one mooring buoy has a unique ID that is transmitted to the booking system on a periodic basis to obtain the at least one booked vessel ID from the booking system.

* * * * *